United States Patent [19]
Ziemek et al.

[11] 4,072,035
[45] Feb. 7, 1978

[54] STRENGTHENING OF A WELDING SEAM

[75] Inventors: Gerhard Ziemek; Friedrich Schatz, both of Langenhagen, Germany

[73] Assignee: Kabel-und Metallwerke, Hannover, Germany

[21] Appl. No.: 677,172

[22] Filed: Apr. 15, 1976

[30] Foreign Application Priority Data

Apr. 18, 1975 Germany .............................. 2517248

[51] Int. Cl.² ...................... B23K 37/00; B23K 31/06
[52] U.S. Cl. ......................................... 72/209; 72/52; 72/370; 228/19; 228/125
[58] Field of Search .................. 228/19, 17, 175, 125, 228/199, 158; 72/52, 209, 370

[56] References Cited

U.S. PATENT DOCUMENTS

| 1,611,875 | 12/1926 | Belmont | 228/19 |
| 3,590,622 | 7/1971 | Elge et al. | 228/156 |
| 3,716,908 | 2/1973 | Rowell | 228/147 X |

Primary Examiner—Donald G. Kelly
Assistant Examiner—K. J. Ramsey
Attorney, Agent, or Firm—Ralf H. Siegemund

[57] ABSTRACT

The longitudinal welding seam of a tube is subjected to flexing to obtain strengthening by up and down bending followed by one or multiple stage rolling which in turn is followed by sizing.

9 Claims, 5 Drawing Figures

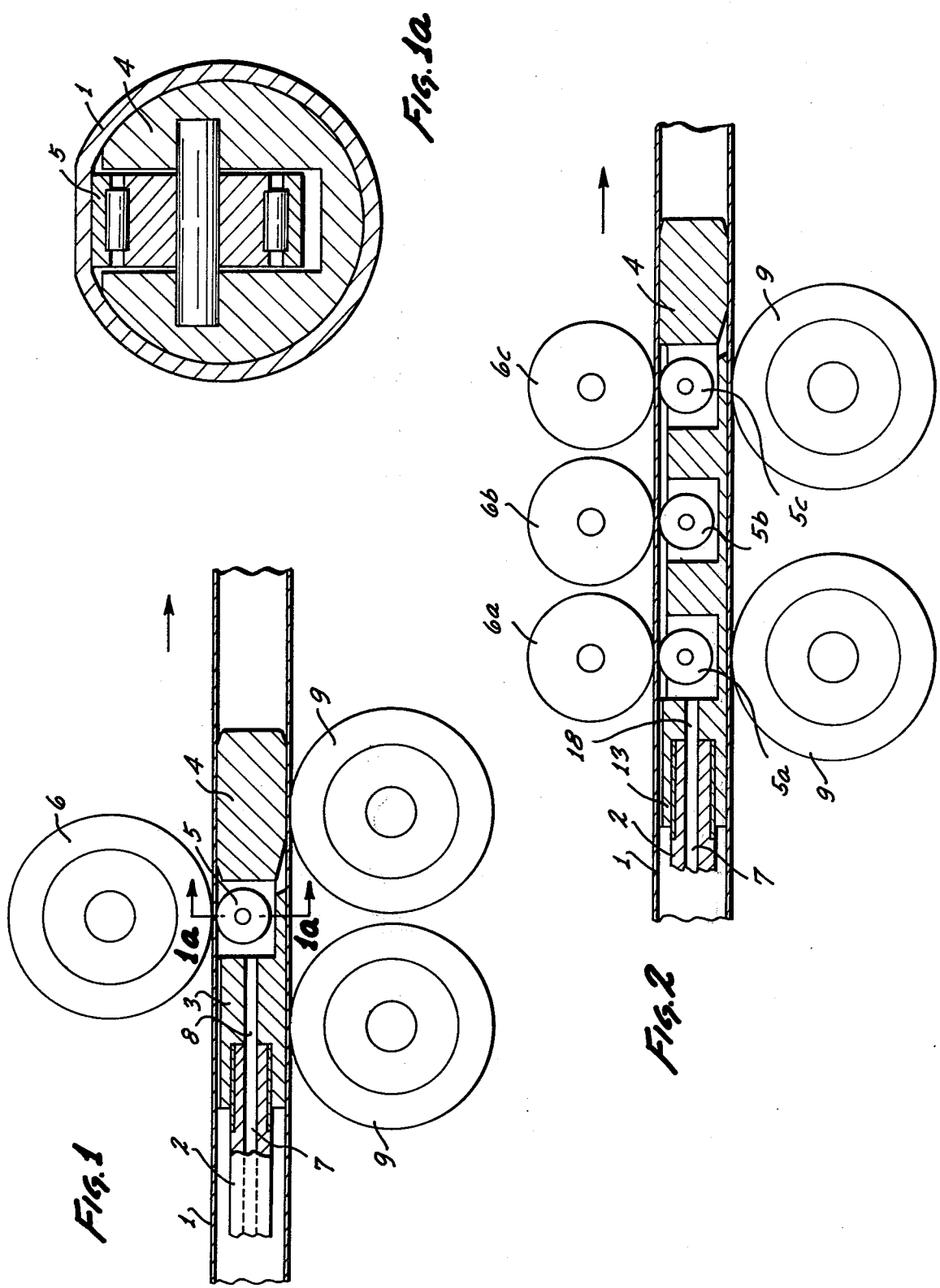

STRENGTHENING OF A WELDING SEAM

BACKGROUND OF THE INVENTION

The present invention relates to strengthening of welding seams and more particularly the present invention relates to strengthening of the seam of a longitudinally welded thin-walled, nonferrous, metal tube.

It was found that longitudinally seam welded tubes particularly of the variety made of nonferrous metal such as copper, aluminum or an alloy thereof, have welding seams with a coarser metal grain texture than the texture of the tube material itself. Such a coarser texture is undesirable particularly because it represents a weakenss in the material and renders the tube more prone to corrosion. Also the tube is more likely to leak or to develop leaks and fissures which, after some period of time, may turn into leaking defects. Therefore, this coarseness in texture has to be eliminated.

A particular method is known for the production of longitudinally seam welded tubes in which a longitudinally paid, metal strip is continuously deformed into a split tube, and the adjoining edges are subsequently welded. After cooling, the welding seam is deformed by means of a pressure roll working from the outside and against a stationary mandrel in the interior of the tube. Such a method is, for example, disclosed in U.S. Pat. No. 3,650,456. This method has the drawback that the underside of the seam, being on the inside of the tube, slides on the stationary mandrel. Of course, the mandrel can be lubricated, but sooner or later some friction and wear will be encountered. Aside from interferring with the production it was found that this method is actually suitable only for tubes which have relatively thick walls. For thin walls, it is not suitable, because sliding friction tends to immediately introduce weak spots in operation or abrasion.

DESCRIPTION OF THE INVENTION

It is an object of the present invention to provide for a method and equipment which permits strengthening of a welding seam by means of cold working under a minimum of friction against the seam during the working process so that seams of very thin-walled tubes can still be strengthened without undue wear.

It is another object of the present invention to provide for a new method and equipment for cold working a welding seam which includes a more intensified working as compared with prior art methods.

In accordance with the preferred embodiment of the present invention, it is suggested to cold roll the welding seam of a longitudinally seam welded, nonferrous tube as well as the adjacent areas and regions which were softened during welding upon the application of heat whereby particularly the cold rolling is to be carried out in a plane which extends horizontally and transversely to the welding seam. Specifically, the seam is to be cold rolled by means of a pair of rolls, one being on the inside and one on the outside of a tube sandwiching the seam and adjacent zones in between along a line that extends transversely to the welding seam but propagates in the direction of the seam. The inside roll is preferably an idler and engages the seam in rolling friction. The forces as applied should harden and strengthen the welding seam by at least 10% preferably even 20%. Subsequently, the tube is sized from the inside, the sizing is to follow immediately the cold rolling process of the seam. Rolling may be carried out in steps with several pairs of rolls acting on the welding seam.

The inventive method has the advantage that the inner surface of the tube will not be worn due to friction. Moreover, the cold working of the seam results in an improved texture because the rolling process is similar to a rolling process carried out in a rolling stand. It is known that rolling optimizes a particular deformation sought to be accomplished.

In accordance with a supplemental feature of the present invention it was found to be of advantage if a welding seam is subjected to bending prior to rolling, preferably by flexing the seam up and down several times. This can be accomplished for example by causing the welding seam to pass through a sinusoidally running path just prior to and ahead of the engagement by rolls for cold rolling.

For carrying out the present invention it is particularly suggested to use a support roll in a bi-parted mandrel whose rear portion acts as a sizer. In addition the mandrel includes one or several inside rolls against which act a corresponding number of rolls from the outside, the welding seam being sandwiched in between. The particular mandrel may also be used as a carrier for a set of rollers co-acting with other rollers on the outside of the tube to force the welding seam through a sinusoidal path. Preferably additional support rollers hold the tube in rolling friction and acting underneath the mandrel. The mandrel may be constructed with a mandrel rod provided with duct means for a continuous supply of lubricant to the roll or rollers in the mandrel. Also, cooling may be provided therethrough, for example, in alternating sequence with the lubrication or concurrently therewith.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a longitudinal section view through welding seam working equipment in accordance with the preferred embodiment of the present invention;

FIG. 1a is a section view along lines 1a in FIG. 1;

FIG. 2 is a similar longitudinal section view of a modified equipment for practicing the present invention by providing rolling in a sequence of steps;

Proceeding now to the detailed description of the drawing, FIG. 1 illustrates a welding seam strengthening machine working a nonferrous metal tube 1, for example, a tube made of a copper-nickel alloy. This tube was made originally by forming a copper-nickel alloy into a split tube so that the strip edges adjoin. These edges have been longitudinally seam welded thereafter. Reference 1a denotes that longitudinal welding seam. The tube as such has, therefore, been completed prior to entering the machine and equipment shown in FIG. 1.

Figure 3:
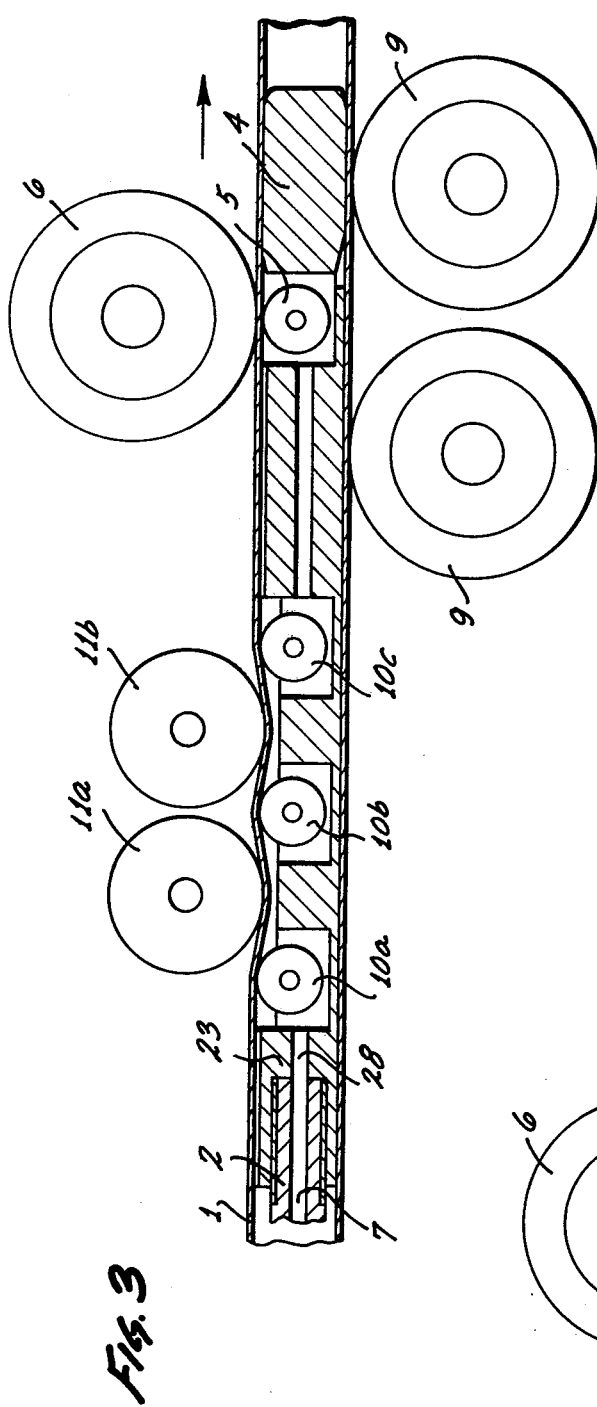
FIG. 3 is a section view of supplemented equipment for practicing the present invention, by bending the seam prior to rolling.

It is particularly presumed that the process of tube making is a continuous one. Therefore, slightly to the left of the equipment shown in FIG. 1, there will be a seam welding station (not shown) possibly followed by a cooling station so that the welding seam to be processed by the equipment shown in FIG. 1 has been sufficiently cooled. It should be noted here that the production line should not be excessively long so that just natural cooling may be impractical, and the provision of a cooling station is, therefore, desirable.

Further to the left of the welding station there will be the tube forming station which is likewise not shown and which processes metal strip which is being reeled, for example, from above or from below into the production line. Therefore, the tube is not yet closed in the area of the tube forming machine, and it is in this area in which one could mount a thrust block or the like for carrying a mandrel rod 2 basically in the cantilever fashion. The end of that mandrel rod extends into the region of the machine shown in FIG. 1 and constitutes a part of that machine.

A two-part mandrel, therefore, is mounted onto the mandrel rod 2 and is secured thereto, for example, by means of bolts. These two parts 3 and 4 are axially spaced apart and in between there is provided a free reeling roll 5. Roll 5 is the internally positioned roll of a pair of rolls; roll 6 on the outside of tube 1 being the other one of the pair. The axes of the two rolls extends transversely to the plane of the drawing. Thus the roll 5 has a line of engagement with tube 1 on the inside thereof; this line extends transversely to the direction of extension of the welding seam 1a which is also the direction of tube advance (see arrow). The co-acting roll 6 being mounted on the outside of tube 1 has an axis which is vertically aligned with the axis of roll 5, and the line of sandwiching engagement with tube 1 are located in the common plane of the two axes. Roll 6 may be suitably driven and the driving motion may be used as advance for the tube 1. However, the tube may additionally or in the alternative be advanced by a caterpillarlike transport.

The mandrel rod 2 has a centrally located axial bore 7 which is axially aligned with the bore 8 in mandrel part 3. Lubricant and/or cooling fluid is fed through bore 7 and into the bore 8 to reach the roll 5. Moreover, the lubricant and cooling liquid will continue beyond roll 5 and lubricate the sizing tool 4. Thus, lubricant has to be supplied continuously throughout the process.

The part 3 of the mandrel should be proportionated so that very little of the tube 1 actually engages that part in order to avoid friction or at least reduce such friction to the absolute minimum. On the other hand, the mandrel head 4 as stated is a sizing and calibrating tool for sizing the tube 1 following the cold rolling process of the welding seam by operation of rolls 5 and 6. Part or head 4 should have an outer diameter which is approximately similar or slightly larger than the diameter of the tube following the rolling.

In order to avoid bending of the cantilevered mandrel rod 2 support rollers 9 are provided in suitable quantity. Presently, it is assumed that one support roll 9 is placed more or less centrally under mandrel part 3 and another roll is placed under sizing tool 4.

The force provided by the roll 6 can be varied by properly choosing the outer diameter of this particular roll. This pressure force should be sufficiently large so that the region of the welding seam 1a is strengthened by about 20%.

Proceeding now to the description of FIG. 2, certain elements are similar to the elements shown in FIG. 1 and are denoted by like numerals. These include particularly the mandrel rod 2 with its internal bore 7, the work 1, the support rolls 9, and the sizing tool and mandrel head 4. The mandrel 13 in this case is of longer construction and carries three internal rolls 5a, 5b, and 5c. They are basically similar to the roll 5 in FIG. 1 except that there are three of them. Correspondingly there are three outside rolls 6a, 6b, and 6c, to obtain a three stage, cold rolling process. This way the cold working and strengthening of the welding seam is carried out in three small sequential steps. Due to the longer construction of the mandrel part 13 it is advisable to place the support rollers 9 to be in vertical alignment with the first and the last pair of rolls in this particular three-pair rolling path.

The particular embodiment shown in FIG. 3 includes the elements 2, 4, 5, 6, and 9 as explained above with reference to FIG. 1. The tube whose welding seam 1a is to be strengthened is again denoted by reference numeral 1. The first mandrel part 23 in this case is a rather long construction part but its front end is similarly constructed to mandrel part 3 in carrying the internal roll 5 just as roll 5 is supported in the embodiment shown in FIG. 1. Also the sizing head is connected to part 23 at that front end. The rear portion of the mandrel 23 is provided to accommodate three rolls, 10a, 10b, and 10c, which support the tube 1 from the inside. In between respective two of these rolls but acting from the outside there are provided rolls 11a and 11b. By means of this staggered arrangement of rolls, one obtains a multiple flexing and bending action on the welding seam as the tube runs through the tool. Specifically, the tube's wall and particularly the seam 1a therefore are forced into a sinusoidal path resulting in up and down bendings of the welding seam, two times down and two times up.

It was found that this back and forth bending of the tube and particularly of the welding seam introduces a particular kind of cold working that enhances the strength of the seam. The thus pre-strengthened seam is then strengthened additionally by operation of the roll 6 as co-acting with roller 5.

Figure 4:
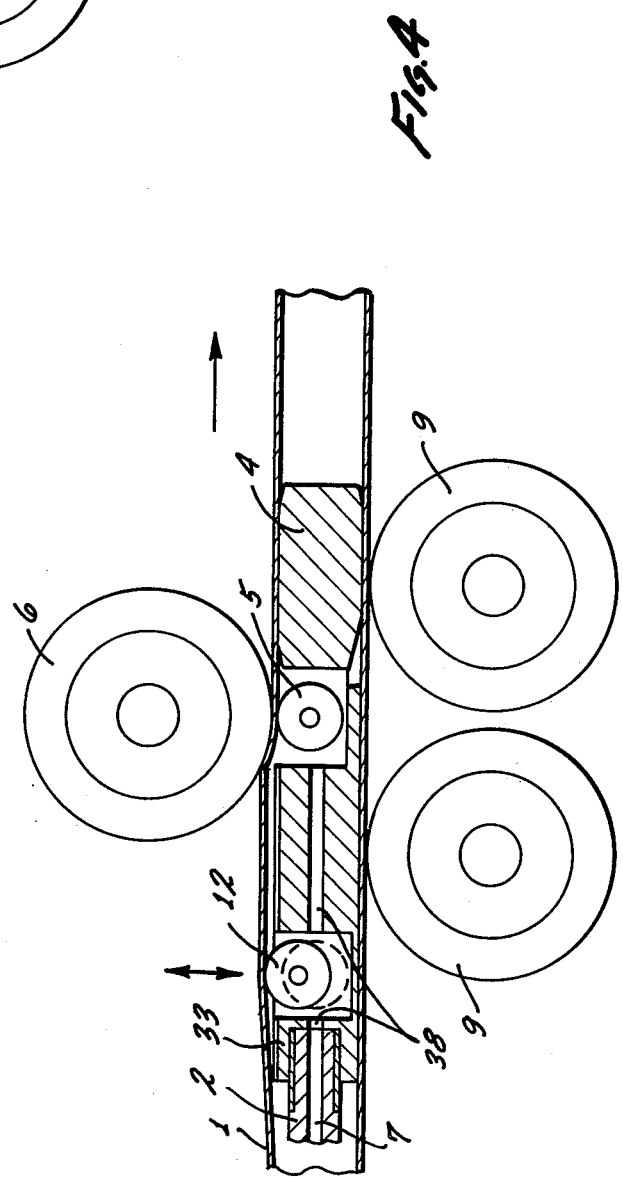
FIG. 4 is a section view of a still further embodidment of the present invention in which bending also precedes rolling.

The particular example shown in FIG. 4 provides for a different kind of bending action. The mandrel part 33 in this case is somewhat shorter constructed as it contains a single bending roll 12 which is adjustable as far as its height position transversely to the axis of mandrel rod 2 is concerned. The roll 12 acts upon the tube from the inside thereof to obtain upward bending and flexing. Roll 6 then forces the seam down again and the operation is followed immediately by the sizing of the tube in the same manner as outlined above using here a similar kind of sizing head.

The roll 12 should be displaceable to such an extent that the raised welding seam area is actually put under circumferential tension. It is of particular advantage here to use a cambered roll whereby the radius of curvature of the cambered periphery of roller 12 is selected to be a little smaller than the radius of curvature of the tube 1. It can readily be seen that the welding seam is deformed and worked in this manner in longitudinal axial direction but also in the peripheral direction.

The invention is not limited to the embodiments described above but all changes and modifications thereof not constituting departures from the spirit and scope of the invention are intended to be included.

We claim:

1. Method of strengthening the welding seam of a longitudinally seam welded, thin-walled, nonferrous metal tube comprising the steps of cold rolling the seam and adjacent zones of the tube which did also soften during the welding, by at least one pair of cylindrical rolls acting on the seam from the inside and the outside of the tube respectively on a flattened portion thereof, including the seam and the adjacent zones and acting in lines of engagement with the seam extending transversely to the welding seam, the rolling progressing transversely to the tube in a length direction of propagation of the tube, thereby strengthening the seam and the adjacent zones by at least 10%; and sizing the tube immediately following the cold rolling.

2. Method as in claim 1 subjecting the seam to bending prior to the rolling.

3. Method as in claim 2 wherein the bending includes several up and down bending steps.

4. Method as in claim 1 wherein the rolling step is carried out in several sequential steps for sequentially strengthening the seam.

5. Apparatus for strengthening the welding seam of a longitudinally seam welded, thin-walled, nonferrous metal tube comprising at least one pair of cylindrical rolls for cold rolling the seam and adjacent zones of the tube which did also soften during the welding, the rolls of the pair acting from the inside and from the outside of the tube respectively and in lines of engagement with the seam extending transversely to the welding seam and progressing transversely to the tube in a lengthwise direction of propagation of the tube and thereby strengthening the seam and adjacent zone by at least 10%;

a mandrel in sliding surface to surface contact with at least a portion of the inside surface of the tube and having two parts, a first part thereof carrying the inside roll of the pair, a second part being positioned behind the pair of rolls for sizing the tube following the cold rolling; and at least one support roll underneath said mandrel to support the mandrel and the tube thereon from below, said outside roll of the pair being above the tube.

6. Apparatus as in claim 5 and including means for bending the welding seam ahead of cold rolling by said means for rolling.

7. Apparatus as in claim 6 wherein said means for bending include at least one roll, for bending the welding seam of the tube as it passes, the latter roll and the inside roll of said pair being mounted on a mandrel.

8. Apparatus as in claim 6 and including a plurality of rolls arranged in staggered arrangement from the inside and on the outside of the tube to provide for up and down bending of the welding seam.

9. Apparatus as in claim 5 and including ducts in the mandrel for conducting lubricating and/or cooling fluid to said support roll.

* * * * *